United States Patent [19]

Spierings et al.

[11] Patent Number: 4,680,503
[45] Date of Patent: Jul. 14, 1987

[54] GLASS COMPOSITION SUITABLE FOR USE IN A FLUORESCENT LAMP AND IN A CATHODE-RAY TUBE, FLUORESCENT LAMP AND CATHODE-RAY TUBE MANUFACTURED USING THIS GLASS COMPOSITION

[75] Inventors: Gijsbertus A. C. M. Spierings; Denise M. Krol; Gary E. Thomas, all of Eindhoven, Netherlands

[73] Assignee: U.S. Philips Corporation, New York, N.Y.

[21] Appl. No.: 785,421

[22] Filed: Oct. 8, 1985

[30] Foreign Application Priority Data

Oct. 10, 1984 [NL] Netherlands ......................... 8403076

[51] Int. Cl.[4] .................... H01J 31/00; C03C 3/108; C03C 3/105; C03C 3/072
[52] U.S. Cl. ................................ 313/480; 313/493; 501/61; 501/62; 501/75
[58] Field of Search ......................... 501/61, 62, 75; 313/480, 493

[56] References Cited

U.S. PATENT DOCUMENTS

| | | | |
|---|---|---|---|
| 2,469,867 | 5/1949 | Danzin | 501/61 |
| 2,916,388 | 12/1959 | Earl | 501/61 |
| 3,808,042 | 4/1974 | Dietz | 501/61 |
| 4,542,105 | 9/1985 | Furukawa et al. | 501/61 |

*Primary Examiner*—Mark L. Bell
*Attorney, Agent, or Firm*—Norman N. Spain

[57] ABSTRACT

The glass composition in accordance with the invention is characterized by the absence of alkali metal oxides and by the presence of at least 10% by weight of barium oxide.

The glass composition in accordance with the invention has favorable working properties (melting temperature below 1500° C., working range in excess of 200 Celsius degrees, it is very corrosion resistant (also in a strong electric field), it is resistant to metal vapors including mercury vapor, it does not attack a phosphor and it is not subject to blackening.

The glass composition in accordance with the invention is extremely suitable for use in fluorescent lamps (TL-, SL- and PL-lamps) and in projection-television face plates.

2 Claims, 2 Drawing Figures

GLASS COMPOSITION SUITABLE FOR USE IN A FLUORESCENT LAMP AND IN A CATHODE-RAY TUBE, FLUORESCENT LAMP AND CATHODE-RAY TUBE MANUFACTURED USING THIS GLASS COMPOSITION

BACKGROUND OF THE INVENTION

The invention relates to a glass composition which comprises silicon dioxide, aluminum oxide, boric oxide, barium oxide and lead oxide.

The invention further relates to a fluorescent lamp comprising a hermetically sealed glass lamp-envelope, in which two electrodes connected to current supply wires are provided between which a discharge takes place during operation of the lamp, the lamp envelope being filled with a gas atmosphere and a metal which evaporates at least partly during operation of the lamp.

In a preferred embodiment of the invention the metal, which evaporates at least partly during operation of the lamp, comprises mercury.

The invention further relates to a cathode-ray tube comprising, in an evacuated envelope, a picture screen which has been provided on the inner side of a face plate which forms part of the wall of the envelope, which picture screen comprises luminescent material.

From Netherlands Patent Specification No. NL 55914 a glass composition is known, which apart from silicon dioxide, aluminum oxide, boric oxide, barium oxide and lead oxide also comprises alkali metal oxides and fluorine. The coefficient of expansion of this type of glass is, approximately, $90 \cdot 10^{-7} K.^{-1}$.

If the glass composition of the said Netherlands Patent Specification is used in a fluorescent lamp, the glass will be attacked by the metal vapour which is present in the lamp during operation, particularly if sodium vapour or mercury vapour is used. In addition, any phosphor present on the inside wall of the lamp envelope will be contaminated by mobile elements from the glass, due to the high temperature necessary for sealing and further shaping of the lamp. Both harmful effects can be attributed to the presence in the glass composition of alkali metal oxides, particularly sodium oxide. In order to obtain glass compositions having suitable working properties, the present state-of-the-art requires the presence of at least alkali metal oxides or lead oxide. A large quantity of lead oxide may, however, be disadvanteous, as under certain circumstances lead oxide is reduced to lead causing the glass to blacken. On the other hand, when replacing lead oxide by, for example, calcium oxide, the melting point of the glass becomes undesirably high.

When the above-described glass composition is used in a cathode-ray tube, particularly in a cathode-ray tube for projection television or for an oscilloscope, the high electric field-intensity will give rise to a high degree of contamination of the luminescent material by alkali metal oxides from the glass and to substantial discolouring of the glass by reduction of the lead oxide to lead.

BRIEF SUMMARY OF THE INVENTION

It is the object of the invention to provide a glass composition suitable for use in fluorescent lamp and in a cathode-ray tube, such that contamination by alkali metal oxides is prevented, the glass melting temperature is lower than 1500° C., the working range of the glass is greater than 200 Celsius degrees and preferably greater than 250 Celsius degrees and that the reduction of lead oxide to lead is suppressed, as well as to provide a fluorescent lamp and a cathode-ray tube as defined above. Besides, the coefficient of expansion of the glass is preferably between 40 and $70 \cdot 10^{-7} K.^{-1}$ (in the temperature range from 30° to 300° C.) in order to facilitate sealing-in of current supply wires made of W or Mo. The glass should also be corrosion-resistant, in particular to water. The working range of a glass composition is defined herein as the difference between the temperatures at which the glass has a viscosity of $10^{6.6}$ Pa.s and $10^{3.0}$ Pa.s, respectively.

According to the invention, this object is accomplished by a glass composition as described in the opening paragraph, which comprises the following components in the specified quantities in % by weight:

| | | | |
|---|---|---|---|
| $SiO_2$ | 30–55 | $ZrO_2$ | 0–10 |
| $Al_2O_3$ | 5–20 | CaO | 0–8 |
| $B_2O_3$ | 4–18 | MgO | 0–3 |
| BaO | 10–25 | SrO | 0–5 |
| PbO | 10–30 | | | in which the total amount of CaO, MgO and SrO is less than 10% by weight and in which the glass composition, apart from small amounts of impurities, is free from alkali metal oxides. Other compatible components may be added to the glass composition in accordance with the invention, such as $Sb_2O_3$ and $CeO_2$, which are used in small quantities as refining agents or to influence the light transmission. Further, $P_2O_5$ may be used to suppress crystallization, and CoO, NiO and/or $Fe_2O_3$ may be used to change the colour of the glass.

According to another aspect of the invention, a fluorescent lamp is provided the lamp envelope of which is manufactured of a glass composition in accordance with the invention. The glass composition in accordance with the invention is also extremely suitable for use in a lamp in which the metal, which partly evaporates during operation of the lamp, comprises mercury.

According to still another aspect of the invention, the object of providing a cathode-ray tube is achieved by a cathode-ray tube of which at least the face plate is manufactured from a glass composition in accordance with the invention. As the screen and the cone should be made of material having approximately the same coefficients of thermal expansion, it may be advantageous to also produce the cone from a glass composition in accordance with the invention.

The invention is based on the recognition that the above-mentioned, desired properties can be obtained by means of a glass composition which does not contain any alkali metal oxides and in which the desired working properties are maintained by complementing the lead oxide with at least 10% by weight of barium oxide. In this case, the content of lead oxide does not have to be very high. Further, the reduction of lead oxide to lead is prevented by the presence of aluminum oxide which has a stabilizing effect on the lead oxide.

British Patent Specification Nos. GB 594992 and GB 597110 describe glass compositions in which, in order to influence the coefficient of thermal expansion, the alkali metal oxides can be replaced by up to 12% by weight of boron oxide. These British Patent Specifications, however, do not mention the problem of the glass being attacked by metal vapour or of a phosphor being attacked by the glass, nor do they establish the correlation between this problem and the presence of alkali metal oxides. The glass compositions in accordance with these British Patent Specifications contain but little barium oxide which is used to counteract any undesirable side effects caused by adding zinc oxide. The melting temperatures of such glass compositions exceed 1500° C., their working properties are less favourable than those of glass compositions in accordance with the invention and they are of a yellowish-green colour.

British Patent Specification No. GB 465077 also describes glass compositions which do not contain alkali metal oxides, but they contain only very little silicon dioxide which adversely affects their working properties. Moreover, these glass compositions contain a high concentration of aluminum oxide bringing about a substantial degree of crystallization of the glass at high working temperatures.

Netherlands Patent Application No. NL 8304361 describes glass compositions which do not contain sodium oxide and only a small quantity of lead oxide. Although these glass compositions do contain lithium oxide and potassium oxide, they, nevertheless, exhibit a high resistance to metal vapours and are only attacked to a very limited extent by any phosphor present. The coefficient of expansion, however, is rather high (90 to $100 \cdot 10^{-7} K.^{-1}$) and the working range is limited (190-200 Celsius degrees), which is a disadvantage, in particular for the drawing of tubes.

DETAILED DESCRIPTION OF THE INVENTION

Figure 1:
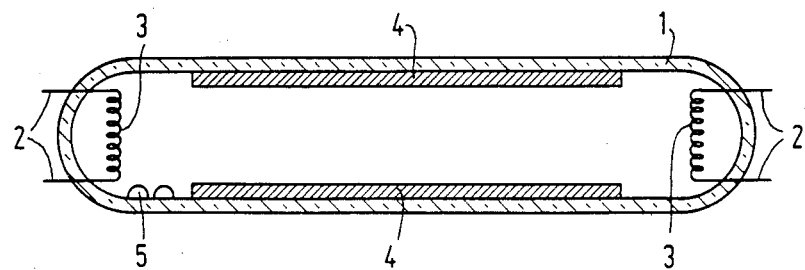
FIG. 1 is a sectional view of a lamp in accordance with the invention.

A few embodiments will now be described in more detail with reference to the drawing Embodiment of a Fluorescent Lamp in Accordance with the Invention FIG. 1 shows a lamp comprising a hermetically sealed lamp envelope 1. Current supply wires 2 are led through the wall of the lamp envelope 1 and are connected to electrodes 3. In the depicted embodiment, the electrodes 3 consist of coiled filaments, but any other known embodiment of the electrodes is also suitable. A phosphor layer 4 is provided on the wall of the lamp envelope 1. Within the lamp envelope 1 there is a small amount of metallic mercury 5 which evaporates after the lamp has been put into operation. Such a lamp is filled with, for example, a gas mixture consisting of 99% by volume of Ne and 1% by volume of Ar, the total pressure amounting to 730 Pa. The lamp envelope 1 is made of a glass composition in accordance with the invention.

Embodiment of a Cathode-Ray Tube in Accordance with the Invention

Figure 2:
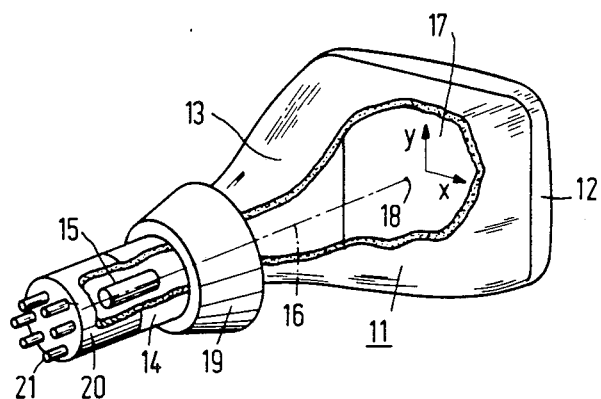
FIG. 2 is a partially exploded, perspective view of a cathode ray tube in accordance with the invention.

FIG. 2 shows a cathode-ray tube having a glass envelope 11, which cathode-ray tube comprises a face plate 12, a cone 13 and a neck 14. An electron gun 15 is provided in the neck for generating an electron beam 16. This electron beam 16 is focussed to a target 18 on a picture screen 17. The picture screen 17 is situated at the inner side of the face plate 12. By means of a deflection system 19 the electron beam 16 is deflected over the picture screen 17 in two mutually perpendicular directions x, y. The tube is provided with a base 20 with connecting pins 21. A layer of a luminescent material (phosphor) is present on the picture screen 17. The face plate 12 is made of a glass composition in accordance with the invention.

Examples of Glass Compositions in Accordance with the Invention and Comparative Examples The glass compositions listed in Table 1 and Table 2 were prepared by fusing the relative components in a platinum crucible in an electric furnace.

Table 1 lists glass compositions in accordance with the invention; nos. 1 to 11. Table 2 lists glass compositions XII to XXI which are comparative examples which do not meet the requirements and do not possess the desired properties of the invention.

Both tables list the compositions in % by weight.

TABLE 1

| | | In accordance with the invention | | | | | | | | | | |
|---|---|---|---|---|---|---|---|---|---|---|---|---|
| | | 1 | 2 | 3 | 4 | 5 | 6 | 7 | 8 | 9 | 10 | 11 |
| composition | $SiO_2$ | 32.7 | 33.7 | 35.7 | 36.0 | 36.1 | 36.2 | 36.2 | 40.5 | 43.8 | 44.6 | 47.7 |
| | $Al_2O_3$ | 11.1 | 11.5 | 5.5 | 12.2 | 5.1 | 5.6 | 11.2 | 5.7 | 6.2 | 6.3 | 5.8 |
| | $B_2O_3$ | 15.2 | 15.7 | 11.3 | 16.7 | 4.1 | 7.7 | 11.4 | 11.7 | 12.4 | 12.9 | 4.0 |
| | BaO | 16.7 | 17.2 | 16.6 | 18.3 | 24.9 | 16.8 | 16.8 | 17.1 | 14.0 | 18.9 | 17.3 |
| | PbO | 24.3 | 20.1 | 24.2 | 13.4 | 12.1 | 24.4 | 24.4 | 25.0 | 20.3 | 13.8 | 25.2 |
| | $ZrO_2$ | — | — | 6.7 | — | 7.9 | 6.2 | — | — | — | — | — |
| | CaO | — | — | — | 3.4 | 4.9 | 3.0 | — | — | 1.7 | 3.5 | — |
| | MgO | — | — | — | — | — | — | — | — | 1.2 | — | — |
| | SrO | — | — | — | — | 4.9 | — | — | — | — | — | — |
| | ZnO | — | 1.8 | — | — | — | — | — | — | — | — | — |
| preparation temperature °C. | | 1350 | 1350 | 1400 | 1400 | 1400 | 1400 | 1400 | 1400 | 1400 | 1400 | 1400 |
| U.S. softening point °C. | | 766 | 762 | — | 787 | 849 | 791 | 746 | 740 | 767 | 774 | 821 |
| working range Celsius degrees | | 279 | 267 | — | 242 | 210 | 230 | 269 | 258 | 270 | 247 | 341 |

TABLE 1-continued

| | In accordance with the invention | | | | | | | | | | |
|---|---|---|---|---|---|---|---|---|---|---|---|
| | 1 | 2 | 3 | 4 | 5 | 6 | 7 | 8 | 9 | 10 | 11 |
| coefficient of expansion $10^{-7}$ K$^{-1}$ | — | — | 51 | — | — | 57 | 53 | 53 | — | 53 | 49 |

TABLE 2

| | Not in accordance with the invention. | | | | | | | | | |
|---|---|---|---|---|---|---|---|---|---|---|
| | XII | XIII | XIV | XV | XVI | XVII | XVIII | XIX | XX | XXI |
| composition SiO$_2$ | 52.7 | 43.9 | 26.6 | 45.3 | 50.0 | 28.3 | 34.4 | 41.1 | 40.0 | 28.8 |
| Al$_2$O$_3$ | 6.4 | 6.1 | 20.1 | 11.8 | 6.1 | — | — | — | 22.7 | 5.0 |
| B$_2$O$_3$ | 13.0 | 12.8 | 13.8 | 8.1 | 8.3 | 7.3 | 16.1 | 15.9 | 4.0 | 9.0 |
| BaO | — | — | 7.5 | 8.9 | 9.1 | 32.1 | 17.5 | 17.5 | 8.5 | 14.4 |
| PbO | 27.9 | 27.2 | 22.0 | 25.9 | 26.5 | 23.4 | 25.6 | 2.5 | 24.8 | 41.9 |
| CaO | — | — | — | — | — | 8.8 | 6.4 | — | — | — |
| ZnO | — | 9.9 | — | — | — | — | — | — | — | — |
| preparation temperature °C. | 1550 | 1600 | >1550 | >1550 | 1600 | 1300 | >1550 | 1600 | >1550 | 1200 |
| U.S. softening point °C. | 786 | 752 | — | — | — | 730 | — | 756 | — | 642 |
| working range Celsius degrees | 427 | 259 | — | — | — | 141 | — | 274 | — | 185 |
| coefficient of expansion $10^{-7}$ K$^{-1}$ | 33 | 33 | — | — | — | — | — | — | — | 62 |

The preparation temperature is the lowest temperature at which fusing of the relevant components resulted in a clear glass melt. The indication >1550 means that no clear glass melt is obtained at temperatures below 1550° C. The U.S. softening point is the temperature at which the glass melt has a viscosity of $10^{6.6}$ Pa.s. The working range of a glass composition is defined herein as the difference between the U.S. softening point and the temperature at which the glass melt has a viscosity of $10^{3.0}$ Pa.s. The coefficient of (linear) expansion has been measured in the temperature range of from 30° to 300° C.

The glass compositions listed in Table 1 can all be melted at a temperature of 1400° C. or lower and they have a working range which exceeds 200 Celsius degrees. The coefficient of thermal expansion is between 40 and 70·$10^{-7}$K.$^{-1}$. When the glass compositions are heated in a gradient furnace for one hour at temperatures ranging from 750° to 1200° C., they do not exhibit any signs of crystallization. The glass compositions exhibit a minimal degree of corrosion under the influence of water, even when there is a strong electric field. The presence of zirconium oxide in glass compositions 3, 5 and 6 does not improve the properties of these glass compositions, yet it does reduce the corrosion of the refractory materials which are used in several glass furnaces.

Glass compositions XII to XVI as listed in Table 2, do not contain enough barium oxide, thus the fusibility does not meet the requirements. Barium oxide cannot be fully replaced by zinc oxide as appears from the required preparation temperature of glass composition XIII. Moreover, glass composition XIII exhibits signs of crystallization when it is heated to temperatures exceeding 750° C.

The glass compositions XVII to XIX do not contain sufficient aluminum oxide. The fusibility of these glass compositions is insufficient, except when an extremely large quantity of barium oxide is used (glass composition XVII), but in that case the working range is too small. The glass compositions XVII to XIX exhibit signs of crystallization when they are heated to temperatures exceeding 800° C.

The glass compositions XIV and XX, on the contrary, contain too much aluminum oxide. Also in this case, the fusibility is insufficient and there are signs of crystallization.

Glass composition XXI contains too much lead oxide. The temperature at which the melting operation can be carried out is indeed low, but the working range is small too.

The correct quantity of lead oxide is dictated by two requirements: the quantity must be large enough to permit good fusibility, but it must not be too large, as this would cause the glass to blacken due to the reduction of lead oxide to lead. The correct quantity of boron oxide is also largely determined by the fusibility requirement. The upper and lower limits of the required quantity of aluminium oxide are dictated by crystallization effects in the glass. In accordance with the invention, the quantity of barium oxide should be greater than 10% by weight and may be complemented with calcium oxide, strontium oxide and/or magnesium oxide. Too great a quantity of the latter components causes the working range of the glass composition to become too small.

The glass compositions which are free from alkali metal oxides in accordance with the invention, can be advantageously used in lamp envelopes for fluorescent lamps and in face plates for projection television cathode-ray tubes, but other uses where the absence of mobile components in the glass is advantageous, for example, there where corrosion of the glass is a problem, are also possible.

What is claimed is:

1. A fluorescent lamp comprising a hermetically sealed glass lamp envelope, in which two electrodes connected to current supply wires are provided, between which electrodes a discharge takes place during operation of the lamp, the lamp envelope being filled with a gas atmosphere and a metal which evaporates at least partially during operation of the lamp, characterized in that the lamp envelope is manufactured from a glass composition which consists essentially of silicon dioxide, aluminium oxide, boron oxide, barium oxide, and lead oxide, characterized in that the glass composition consists essentially of the following components in the specified quantities in % by weight:

| | | | |
|---|---|---|---|
| $SiO_2$ | 30–55 | $ZrO_2$ | 0–10 |
| $Al_2O_3$ | 5–20 | CaO | 0–8 |
| $B_2O_3$ | 4–18 | MgO | 0–3 |
| BaO | 10–25 | SrO | 0–5 |
| PbO | 10–30 | | | in which the total amount of CaO, MgO and SrO is less than 10% by weight and in which the glass composition, apart from small amounts of impurities, is free from alkali metal oxides.

2. A cathode-ray tube comprising, in an evacuated envelope, a picture screen provided on the inner side of a face plate which forms part of a wall of the envelope and which picture screen comprises luminescent material, characterized in that at least the face plate is manufactured from the glass composition consisting essentially of the following components in the specified quantities in % by weight:

| | | | |
|---|---|---|---|
| $SiO_2$ | 30–55 | $ZrO_2$ | 0–10 |
| $Al_2O_3$ | 5–20 | CaO | 0–8 |
| $B_2O_3$ | 4–18 | MgO | 0–3 |
| BaO | 10–25 | SrO | 0–5 |
| PbO | 10–30 | | | in which the total amount of CaO, MgO and SrO is less than 10% by weight and in which the glass composition, apart from small amounts of impurities, is free from alkali metal oxides.

* * * * *